June 12, 1945. R. W. WARRICK 2,378,344
VAPORIZING MANIFOLD FOR INTERNAL-COMBUSTION ENGINES
Filed June 9, 1943
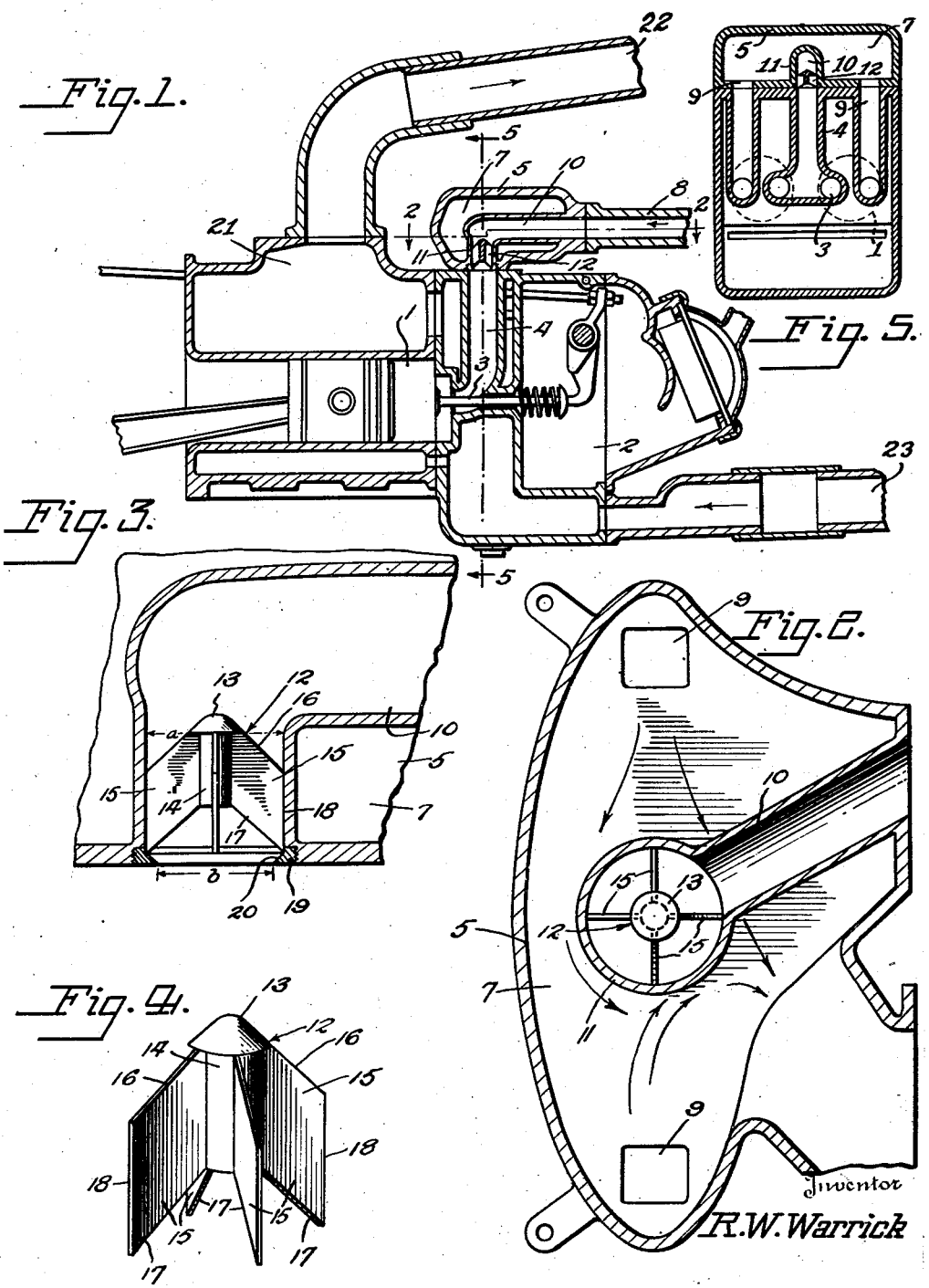

Patented June 12, 1945

2,378,344

UNITED STATES PATENT OFFICE 2,378,344

VAPORIZING MANIFOLD FOR INTERNAL-COMBUSTION ENGINES

Ray W. Warrick, Crozet, Va.

Application June 9, 1943, Serial No. 490,197

3 Claims. (Cl. 257—241)

This invention relates to a vaporizing device for use in connection with internal combustion engines where it is proposed to start the engine with gasoline or a similar volatile fuel and then substitute a cheaper and less volatile fuel after the engine has become heated. More broadly, it relates to fuel vaporizing and pre-heating devices for internal combustion engines.

The initial problem encountered in devices of this character is that of concentrating the initial heat produced while the engine is operating on the more volatile gasoline to effectively vaporize the less volatile fuel at an early stage of the operations and devices having this problem primarily in mind are illustrated in my prior Patents No. 2,213,154 and No. 2,242,841.

A further problem, however, arises in connection with the uses of such devices in which the fuel supply conduit is more or less restricted by reason of the special structure involved with a resultant increase in the back pressure on the fuel mixture supply resulting in a diminished sufficiency of the engine in its normal operation on the less volatile fuel.

The present invention is directed to meeting both problems by providing a highly efficient heat exchange device between the walls of the fuel conduit where it passes through the exhaust gas manifold of a construction adapted to substantially eliminate such back pressure and permit the free passage of the fuel mixture which greatly improves the efficiency of the engine.

A further object is to provide means for thoroughly vaporizing the fuel, of whatever character, and distributing heat uniformly throughout the mass.

A further object of the invention is to provide a vaporizing device of the character indicated of structure adapted to prevent turbulence or the formation of objectionable currents in the fuel mixture within the heating area.

Further objects will more particularly appear in the following description.

The invention consists in the novel construction, arrangement and combinations of parts hereinafter more particularly described and claimed.

One sheet of drawing accompanies this specification as part thereof in which like reference characters indicate like parts throughout.

Figure 1 is a fragmentary vertical cross section taken through an internal combustion engine showing the application of the present invention;

Figure 2 is a horizontal cross section taken on line 2—2 of Figure 1;

Figure 3 is a fragmentary enlarged view taken on substantially the same cross section line as in Figure 1; and Figure 4 is a perspective view of the heat exchange member removed from the fuel conduit.

Figure 5 is a vertical cross-section taken along the line 5—5 of Figure 1.

The present invention is illustrated herein as applied to a conventional internal combustion engine having the water jacket 21 and water connections 22 and 23 leading therefrom to a radiator, not shown and in the drawing the numeral 1 is directed to a combustion chamber, 2 indicates the cylinder head and 3 the fuel intake valve to which fuel is supplied through conduit 4 which extends beyond the cylinder head into a conduit 10 enclosed within the exhaust gas manifold 5 so as to be completely surrounded by the exhaust gases in chamber 7 of said exhaust manifold. The fuel mixture is supplied from a carburetor (not shown) through a conduit 8.

The exhaust gases from the engine cylinders (the drawing illustrates a two-cylinder engine for convenience) are introduced into the exhaust manifold chamber 7 through conduits 9 and as illustrated in Figure 2 such gases impinge and flow around the portion 11 of the fuel mixture conduit which extends upwardly as an extension of the fuel mixture conduit 4 in the cylinder head and such fuel mixture conduit may, for convenience, be bent as desired herein shown as a right angle to extend from the exhaust manifold at such point as may be desired through a portion 10.

Within the portion 11 of the fuel mixture conduit within the exhaust gas manifold is positioned a heat exchange device 12 which comprises, as illustrated more clearly in Figures 3 and 4, an upper convex deflector cap 13 which as herein illustrated is formed as a head for a body core part 14 to which are secured a plurality of radially extending plates 15 of some suitable heat conducting material such as metal and preferably formed as thin sheets to reduce as little as possible the effective area of the fuel mixture conduit. These plates or fins 15 are arranged in planes parallel to the axis of said core to avoid a vortex and have their outer edges 18 shaped to closely contact the inner face of the conduit 11 from which they are designed to absorb and transmit heat to the deflector cap 13 as well as to diffuse such heat to the fuel mixture passing in contact with them. The overhanging edge of the deflector head of the core also operates to produce vacuum immediately beneath, which draws part of the mixture back against the core, causing it to travel parallel with the core and in intimate contact therewith.

The upper edges 16 of these conductor plates 15 are beveled outwardly and in a direction of travel of the fuel mixture toward the conduit wall and the opposed or rear edges 17 are similarly beveled. Adjacent points where these rear beveled walls of plates 15 contact the conduit wall, that wall is provided with an inwardly directed peripheral flange 20 which may be integral with the conduit wall or may as herein illustrated be formed on a connecting ring 19 adapted to be screwed into juxtaposition with the conduit 11 and thus serve to position the heat conductor member 12 in position within the conduit.

This inwardly and downwardly convergent peripheral flange 20 constitutes a thermal lip for deflecting the relatively slow moving, relatively hot mixture traveling against the wall of said cylindrical portion into entraining relation to the relatively fast axially moving, relatively cool mixture traveling adjacent said core. The lower ends of the fins being inclined from the bottom of said core to said lip, provide a mixing chamber below the bottom of said core and above the plane of said lip.

To secure the maximum efficiency and prevent the back pressure it is essential that the area $b$ at the point of maximum constriction of the conduit by the deflector flange 20 shall be not less than the area of the annular space $a$ between the conduit wall and the deflector cap 13 in the plane of maximum diameter of said cap.

By reason of the structure, proportioning and arrangement of the parts of the heat exchange device 12 as described it will be apparent that the fuel mixture passing through conduit 11 in the direction indicated by the arrows will be deflected by the central deflector element 13 outwardly toward the heated walls of conduit 11 passing between the heat conductor fins 15 in substantially parallel paths and will thereafter be deflected slightly inwardly and toward the center of the conduit within the cylinder head by the peripheral deflector flange 20. The fins 15 need not necessarily be strictly radial, but may be arranged tangential to the body 14 or otherwise as may be convenient, it being essential, however, that these fins 15 in conjunction with the wall of conduit 11 constitute subsidiary conduits parallel with the axis of conduit 11 so that as previously indicated the fuel mixture will pass through the heat exchange device in substantially parallel columns, thus eliminating any rotary turbulence and reducing the back pressure to a minimum while at the same time transmitting heat from the exhaust gases through the conduit wall 11 to the field mixture with the maximum efficiency.

What I claim is:

1. A diffuser and heat exchange device for use in a fuel mixture conduit comprising a body having an end formed as a convex diffuser cap, a plurality of heat-conducting vanes arranged in heat exchange relation to the body, said vanes having their outer edges shaped to engage the conduit wall in heat exchange contact therewith, their forward edges at the cap end of the body sloped in substantial alignment with the cap, the rear edges opposite the cap end similarly sloped, and means for positioning the said device in the conduit comprising a follower ring having an inwardly directed flange sloped oppositely to the angles of the vane edges.

2. In a combustible mixture conduit for supplying combustible mixture to an internal combustion engine, designed to be externally heated by exhaust products from said engine, a cylindrical shell forming part of said conduit having an inwardly extending peripheral flange at its outlet end with a downwardly convergent inner wall, and a diffuser in said shell comprising an axial core, a convex circular axial cap at the inner end of said core of such diameter as to overhang said core, metallic supporting means connecting said core and said shell, said core terminating at its lower end above the plane of the outlet end of said shell restricted by said flange, the cross-sectional area of the passage through said shell restricted by said flange being at least equal to the cross-sectional area of the passage through said shell restricted by said cap.

3. In a combustible mixture conduit for supplying combustible mixture to an internal combustion engine, designed to be externally heated by exhaust products from said engine, a cylindrical shell forming part of said conduit, a diffuser within said shell comprising an axial core consisting of an elongated cylindrical member terminating short of the outlet end of said shell, flat fins in axial planes connecting said cylindrical member throughout its length to the heated wall of said shell for conducting heat to said cylindrical member, and themselves constituting a heating element, the lower edges of said fins sloping from the lower end of said cylindrical member to meet the wall of said shell adjacent its outlet end whereby an undivided mixing space is provided between the lower edges of said fins and the outlet end of said shell, said diffuser having a circular cap at its anterior end defining with the wall of said shell an annular inlet to said shell, the forwardly directed face of said cap being convex for diverting the middle portion of the mixture column entering said diffuser outwardly toward the heated wall of said shell and being of larger diameter than said cylindrical member whereby part of the middle portion of said column is diverted toward said cylindrical member by vacuum produced beneath said cap by flow of mixture past the edge thereof, said diffuser being characterized by the absence of any baffle in the path of that part of the mixture column diverted toward said cylindrical member, the outlet end of said shell terminating in an inwardly and downwardly sloped peripheral flange and diverting the peripheral portion of the mixture column toward the axis of said column.

RAY W. WARRICK.